(12) United States Patent
Yamauchi et al.

(10) Patent No.: US 11,339,753 B2
(45) Date of Patent: May 24, 2022

(54) FUEL SUCTION INLET MEMBER

(71) Applicant: AISAN KOGYO KABUSHIKI KAISHA, Obu (JP)

(72) Inventors: Takehiro Yamauchi, Nagoya (JP); Koji Yoshida, Commerce Township, MI (US); Takashi Kanie, Kariya (JP)

(73) Assignee: Aisan Kogyo Kabushiki Kaisha

( * ) Notice: Subject to any disclaimer, the term of this patent is extended or adjusted under 35 U.S.C. 154(b) by 164 days.

(21) Appl. No.: 16/649,675

(22) PCT Filed: Jun. 8, 2018

(86) PCT No.: PCT/JP2018/022003
§ 371 (c)(1),
(2) Date: Mar. 23, 2020

(87) PCT Pub. No.: WO2019/064707
PCT Pub. Date: Apr. 4, 2019

(65) Prior Publication Data
US 2021/0363950 A1 Nov. 25, 2021

(30) Foreign Application Priority Data
Sep. 26, 2017 (JP) .............................. JP2017-184555

(51) Int. Cl.
*F02M 37/02* (2006.01)
*F02M 37/00* (2006.01)

(52) U.S. Cl.
CPC ...... *F02M 37/025* (2013.01); *F02M 37/0082* (2013.01)

(58) Field of Classification Search
CPC .......................... F02M 37/025; F02M 37/0082
See application file for complete search history.

(56) References Cited

U.S. PATENT DOCUMENTS

2005/0286103 A1* 12/2005 Yu ......................... F02M 37/106
123/509

FOREIGN PATENT DOCUMENTS

| JP | S43967 Y1 | 1/1968 |
| JP | S4859911 U | 7/1973 |
| JP | S59133324 U | 9/1984 |

(Continued)

OTHER PUBLICATIONS

PCT/JP2018/022003 International Preliminary Report on Patentability dated Mar. 31, 2020 (5 p.).

(Continued)

*Primary Examiner* — Jacob M Amick
*Assistant Examiner* — Charles J Brauch
(74) *Attorney, Agent, or Firm* — Conley Rose, P.C.

(57) ABSTRACT

A sender gauge adaptor includes an adaptor body pressed against a bottom wall of a fuel tank by a spring. The adaptor body includes a suction inlet part having a hollow cylindrical shape that opens downward. Recesses allowing fluid communication between the interior and the exterior of the suction inlet part and projection parts having a polygonal-shaped lower surfaces are alternately arranged in the circumferential direction along a lower end of the suction opening. The adaptor body includes a seat part in surface contact with the bottom wall of the fuel tank at a position below the lower surfaces of the projection parts.

6 Claims, 5 Drawing Sheets

(56) References Cited

FOREIGN PATENT DOCUMENTS

| | | |
|---|---|---|
| JP | 2007239681 A | 9/2007 |
| JP | 2016022861 A | 2/2016 |

OTHER PUBLICATIONS

PCT/JP2018/022003 Written Opinion dated Aug. 28, 2018 (4 p.).
PCT/JP2018/022003 International Search Report and Written Opinion dated Aug. 28, 2018 (8 p.).

* cited by examiner

FUEL SUCTION INLET MEMBER

CROSS-REFERENCE TO RELATED APPLICATIONS

The present application is a National Phase entry of, and claims the benefit of, PCT Application No. PCT/JP2018/022003 filed Jun. 8, 2018, which claims priority to Japanese Patent Application No. 2017-184555 filed Sep. 26, 2017, each of which is incorporated by reference herein in its entirety for all purposes.

STATEMENT REGARDING FEDERALLY SPONSORED RESEARCH OR DEVELOPMENT

Not applicable.

BACKGROUND

The present disclosure relates generally to fuel suction inlet members.

One example of a conventional fuel suction inlet member is shown in FIG. 9. As illustrated in FIG. 9, a bracket 134 is secured to a bottom wall 112 of a fuel tank 110. The bracket 134 is provided with an upper support column 146 extending in the vertical direction. A lower support column 148 is coupled to the upper support column 146 in a relatively movable manner in the vertical direction. A tip end, i.e. a lower end of the lower support column 148, is provided with a fuel suction inlet member 136. A coil spring 152 is disposed between the upper support column 146 and the fuel suction inlet member 136 for biasing both in mutually opposed directions. The fuel tank 110 is made from a resin material. The fuel tank 110 is formed in a saddle shape having a first storage part and a second storage part, which are arranged side by side. Each of the first storage part and the second storage part is configured to store fuel therein. The first storage part houses a pump module having a fuel pump for supplying the fuel to an engine or the like. The pump module also includes a jet pump or other mechanisms for transferring the fuel from the second storage part to the first storage part. The fuel suction inlet member 136 is disposed in the second storage part.

A suction inlet body 176 of the fuel suction inlet member 136 has a suction inlet part 174 and a connection port 178. The suction inlet part 174 has a hollow cylindrical shape with an open bottom end. The connection port 178 is in communication with the interior of an upper end portion of the suction inlet part 174. The suction inlet part 174 has recesses 172 and projection parts 173 at a lower end thereof, such that the recesses 172 and the projection parts 173 are alternately arranged in the circumferential direction. Each of the recesses 172 allows communication between the interior and the exterior of the suction inlet part 174. Each of the projection parts 173 contacts the bottom wall 112 of the fuel tank 110. The connection port 178 is connected to a fuel inlet (not shown) of the jet pump of the pump module via a fuel pipe 138.

During operation of the jet pump of the pump module, the fuel in the second storage part of the fuel tank 110 is suctioned into the suction inlet body 176 via the recesses 172 of the suction inlet part 174. The fuel is transferred to the first storage part via the fuel pipe 138. The fuel suction inlet member 136 is pressed against the bottom wall 112 of the fuel tank 110 due to the biasing force, i.e. the elastic restoring force of the coil spring 152. Thus, when the fuel tank 110 expands or contracts in the vertical direction due to changes in temperature or the like, the projection parts 173 of the suction inlet part 174 remain in contact with the bottom wall 112. The fuel suction inlet member 136 is disclosed in Japanese Laid-Open Patent Publication No. 2016-22861.

SUMMARY

In one aspect of this disclosure, a fuel suction inlet member includes a suction inlet body pressed against a bottom wall of a fuel tank by an elastic member. The suction inlet body has a suction inlet part having a hollow cylindrical shape that opens downward. The suction inlet part has recesses and projection parts at a lower end thereof such that the recesses and the projection parts are alternately arranged in a circumferential direction about suction inlet part. Each of the recesses allows communication between an interior and an exterior of the suction inlet part. Each of the projection parts has a polygonal-shaped lower surface. The suction inlet body is provided with a support part that abuts the bottom wall of the fuel tank along a surface contact at a position below the lower surfaces of the projection parts.

In accordance with this aspect, the support part of the suction inlet body can prevent the projection parts from abutting the bottom wall of the fuel tank. Thus, the support part is able to prevent or reduce the likelihood of a corner of the lower surface of each projection part from damaging the bottom wall of the fuel tank.

In another aspect of this disclosure, the support part may have a ring shape and surround the suction inlet part.

In accordance with this aspect, the support part can be made compactly at the suction inlet part. Further, support part is configured to prevent the seat part from abutting on the bottom wall in a point contact manner regardless of deformation of the bottom wall of the fuel tank.

DETAILED DESCRIPTION

Figure 9:
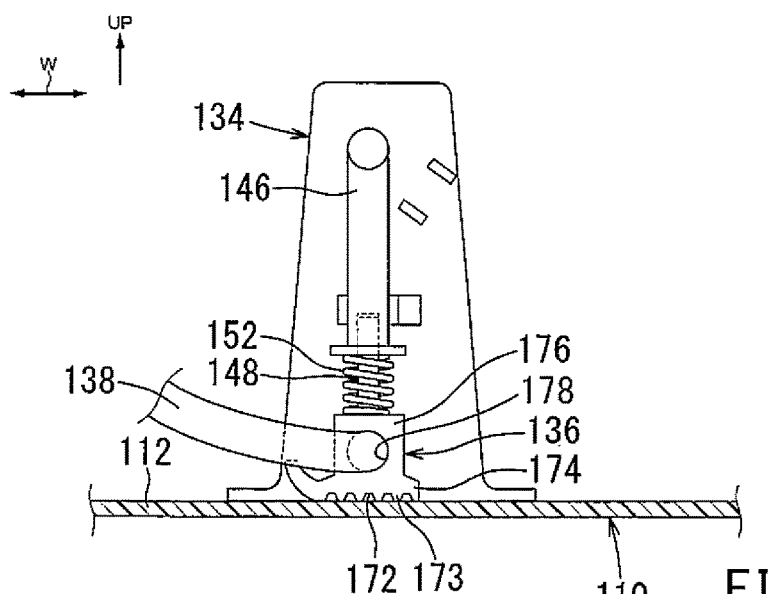
FIG. 9 is schematic view of a conventional fuel suction inlet member.

As previously described, during operation of the conventional fuel suction inlet member shown in FIG. 9, the fuel suction inlet member 136 is pressed against the bottom wall 112 of the fuel tank 110 due to the biasing force, i.e. the elastic restoring force of the coil spring 152. In some cases, when the fuel tank 110 contracts, the bottom wall 112 bends in a wave manner. In such state, a corner, often an outside corner, of the lower surface of each projection part 173 of the suction inlet part 174 may abut on the bottom wall 112 at a point contact. Further, when the fuel tank 110 is in a contracted state, the biasing force exerted by the coil spring 152 against the fuel suction inlet member 136 is increased. Thus, a concentrated stress from the corner of the lower surface of each projection part 173, which abuts on the bottom wall 112 at the point contact, may be increased and potentially damage the bottom wall 112. Accordingly, there has been a need for improved fuel suction inlet members.

One embodiment in accordance with the principles described herein will be described with reference to the drawings. In this embodiment, a sender gauge adaptor of a suction module of a fuel tank for a vehicle is exemplified as a fuel suction inlet member. The fuel tank is formed in a saddle shape having a first storage part and a second storage part, which are arranged side-by-side. Each of the first storage part and the second storage part is configured to store fuel therein. The first storage part houses therein a pump module including a fuel pump for supplying the fuel to an engine or the like. The pump module includes a jet pump or other mechanisms for transferring the fuel from the second storage part to the first storage part. The suction module is disposed in the second storage part.

Arrows in each drawing illustrate forward, rearward, rightward, leftward, upper, and lower directions of a fuel supply device. The up-down direction corresponds to the gravity direction in a state where the fuel supply device is disposed in the fuel tank of a vehicle, i.e. the vertical direction. The front-rear direction and the right-left direction do not limit installation directions of the fuel supply device.

Figure 2:
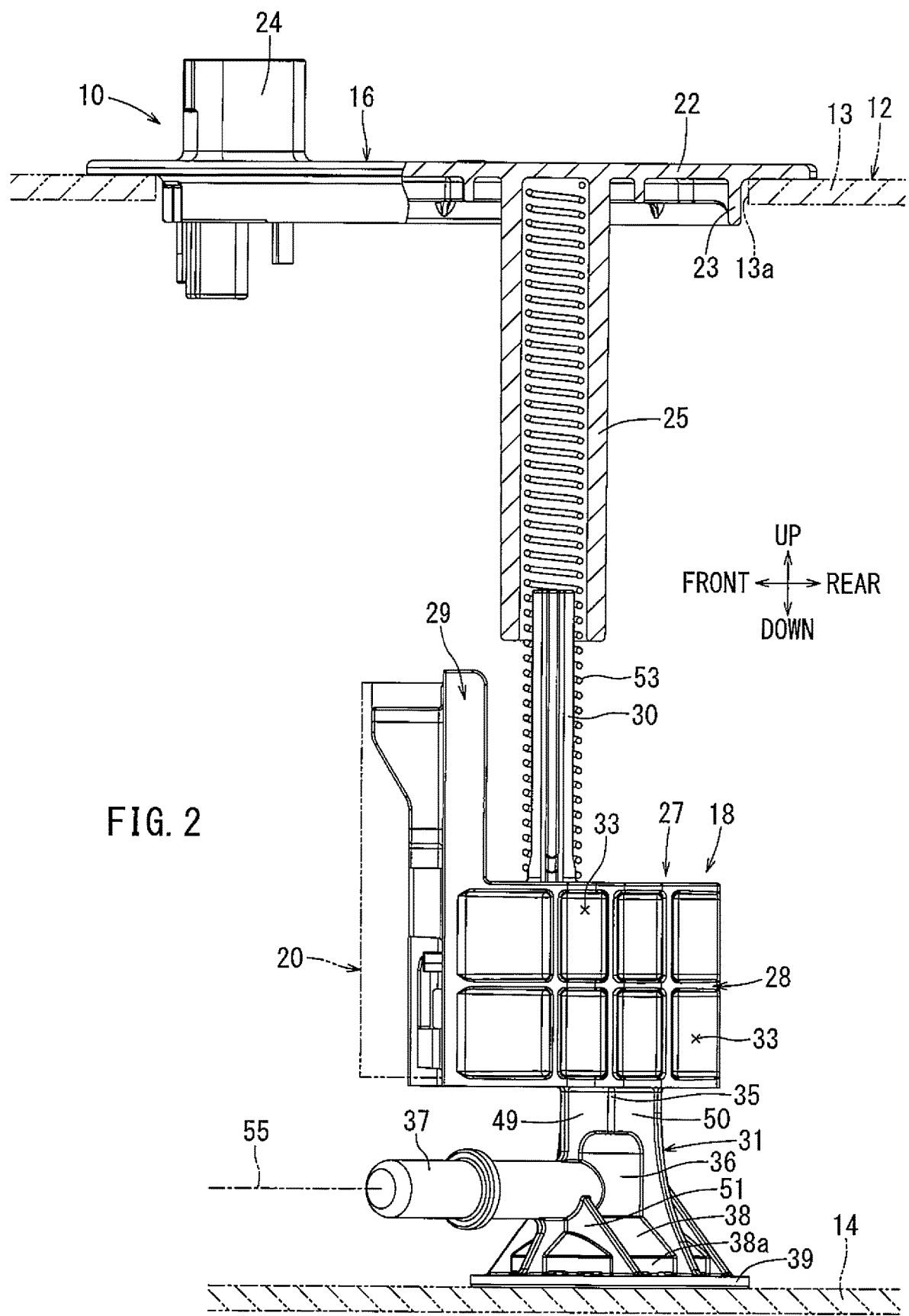
FIG. 2 is a partial cross-sectional view of the suction module of FIG. 1, viewed from a right side.

The structure of an embodiment of the suction module will be described. Referring now to FIG. 2, an embodiment of a suction module 10 is a top mounting type, which is attached to an upper wall 13 of a fuel tank 12. The fuel tank 12 is a resin-made hollow container having the upper wall 13 and a bottom wall 14. The upper wall 13 defines an opening 13a having a circular shape.

Figure 1:
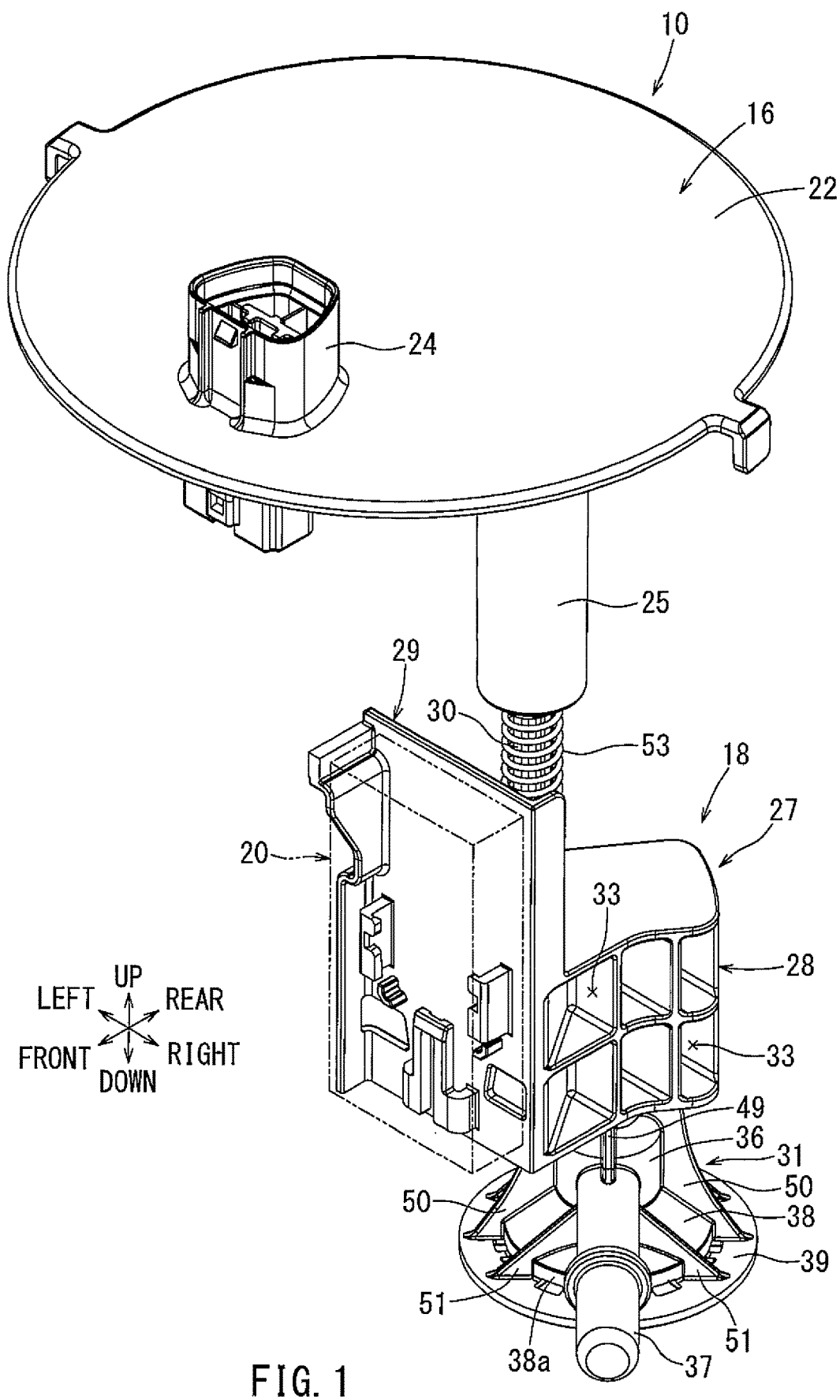
FIG. 1 is a perspective view of an embodiment of a suction module according to principles described herein.

As shown in FIG. 1, the suction module 10 includes a lid member 16, a sender gauge adaptor 18, and a sender gauge 20. The lid member 16 includes a lid body 22 having a circular shape and is made from a resin material. As illustrated in FIG. 2, a fitting wall 23 having a ring shape is provided at a lower surface of the lid body 22 and is coaxially aligned with the lid body 22. The fitting wall 23 has an outer diameter slightly smaller than the outer diameter of the lid body 22. The lid body 22 is provided with an electric connector part 24. The lid body 22 has a guide pipe part 25 with a hollow cylindrical shape extending downward from a lower surface of a central portion of the lid body 22. The guide pipe part 25 extends downward to a position below the fitting wall 23.

The sender gauge adaptor 18 includes a resin-made adaptor body 27. The adaptor body 27 includes a base part 28, a gauge attachment part 29, a guide column part 30, and a fuel suction part 31. The sender gauge adaptor 18 may also be referred to herein as "fuel suction inlet member.", and the adaptor body 27 may also be referred to herein as "suction inlet body."

As illustrated in FIGS. 1 and 2, the base part 28 has a block shape with an upper horizontal surface and a lower horizontal surface. A plurality of lightened parts 33, each having a recess, are formed along the side of the base part 28 except at its front surface.

As illustrated in FIGS. 1 and 2, the gauge attachment part 29 is formed at a front portion of the base part 28. The gauge attachment part 29 has a substantially square shape and extends vertically. An upper portion of the gauge attachment part 29 extends upward to a position above the upper surface of the base part 28. The sender gauge 20 is attached to a front side of the gauge attachment part 29. The sender gauge 20 is a level detector configured to detect the remaining amount of the fuel, i.e. liquid level in the fuel tank 12.

The guide column part 30 has a cylindrical shape and extends upward from the upper surface of the base part 28. The guide column part 30 is coaxially inserted into the guide pipe part 25 of the lid member 16. A predetermined radial gap is provided between the guide column part 30 and the guide pipe part 25. The guide column part 30 and the guide pipe part 25 can move axially (i.e., vertically) relative to each other.

Figure 4:
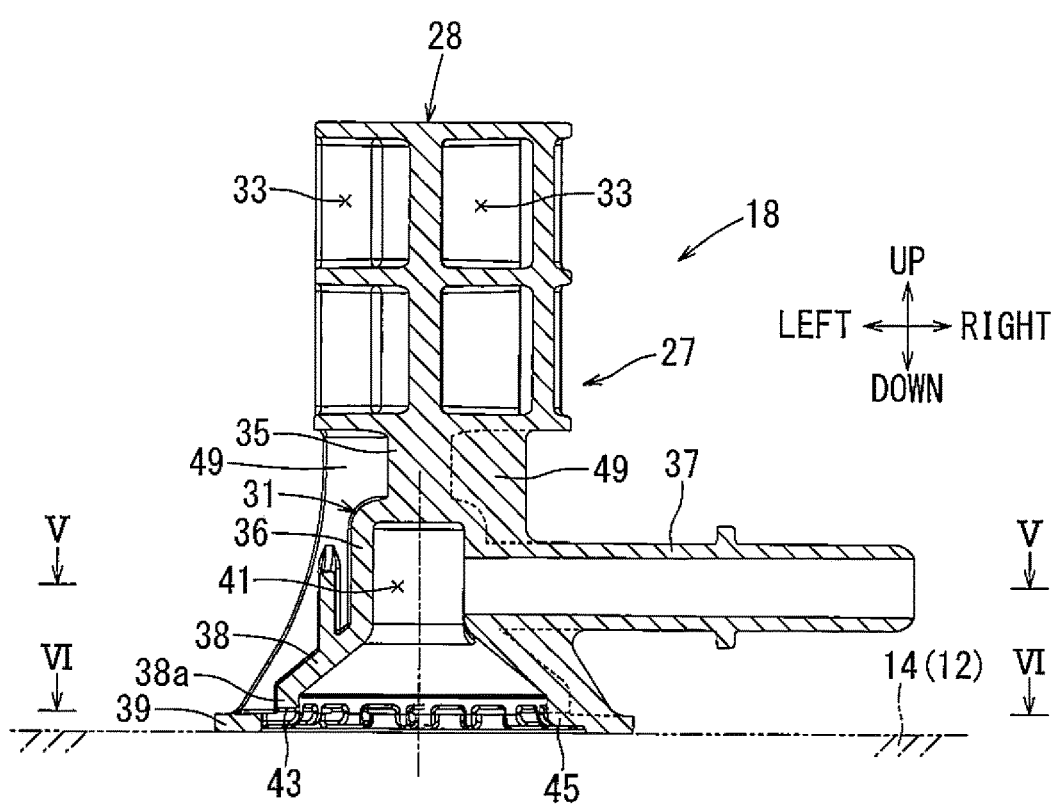
FIG. 4 is a cross-sectional view of the sender gauge adaptor of FIG. 3, taken along line IV-IV in FIG. 3.

As illustrated in FIG. 4, the fuel suction part 31 includes a coupling part 35, a base pipe part 36, a connection pipe part 37, a suction inlet part 38, and a seat part 39. The coupling part 35 has a cylindrical shape and extends downward from the lower surface of the base part 28. The base pipe part 36 has a hollow cylindrical shape and extends coaxially downward from the coupling part 35. The base pipe part 36 has an inner diameter larger than an outer diameter of the coupling part 35. Thus, the upper end of the base pipe part 36 is coupled to a lower end of the coupling part 35 in a stepped manner. As illustrated in FIG. 1, the connection pipe part 37 is a straight pipe extending radially outward from the side of the base pipe part 36. The interior of the connection pipe part 37 is in fluid communication with the interior of the base pipe part 36.

Figure 3:
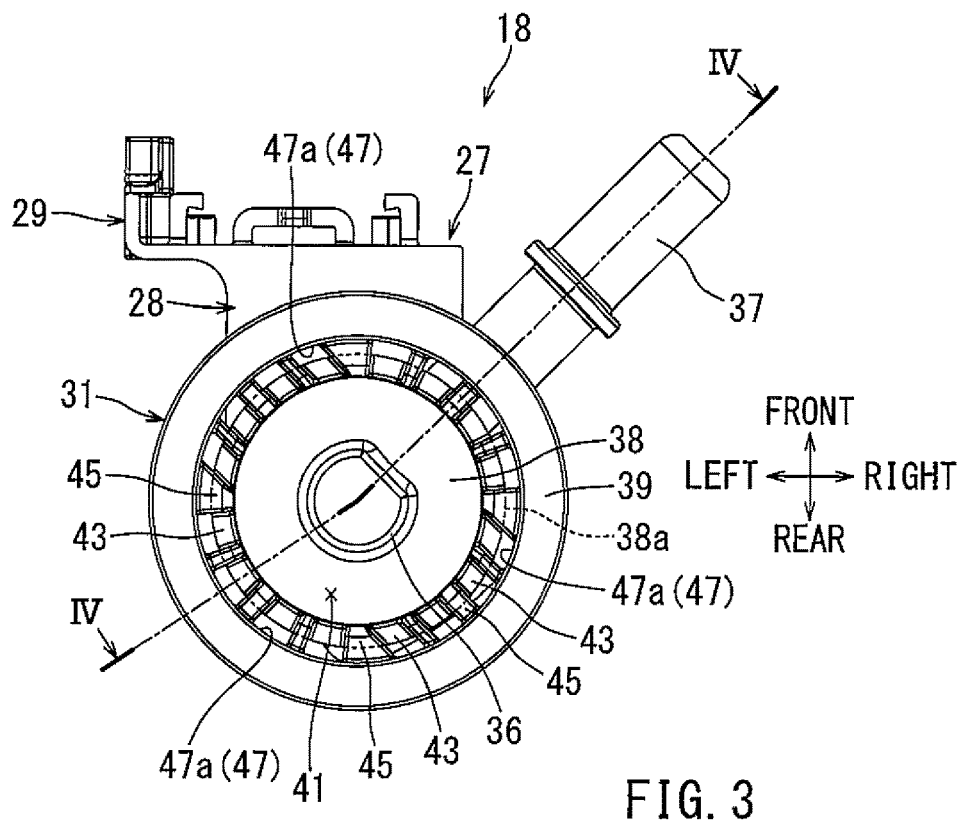
FIG. 3 is a bottom view of a sender gauge adaptor of the suction module of FIG. 1.

As illustrated in FIG. 4, the suction inlet part 38 has a frustoconical shape and extends coaxially downward from the base pipe part 36. An inner space of the base pipe part 36 and an inner space of the suction inlet part 38 form a fuel suction passage 41 that opens downward. A lower end 38a of the suction inlet part 38 has a hollow cylindrical shape. As illustrated in FIG. 3, the lower end 38a has a plurality of (e.g. sixteen) recesses 43 and a plurality of projection parts 45. The recesses 43 and projection parts 45 are alternately arranged in the circumferential direction. Each recess 43 allows communication between the interior and the exterior of the suction inlet part 38. Each projection part 45 has a polygonal-shaped lower surface (e.g., as tetragon, parallelogram, trapezoid, etc. shaped lower surface).

Figure 6:
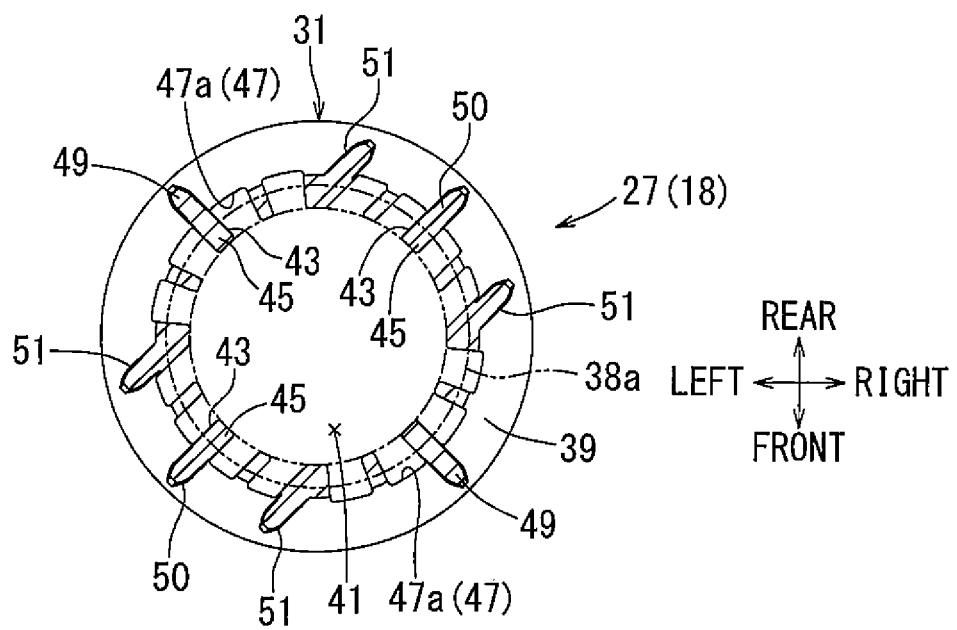
FIG. 6 is a cross-sectional view of the adaptor body of FIG. 4, taken along line VI-VI in FIG. 4.
Figure 7:
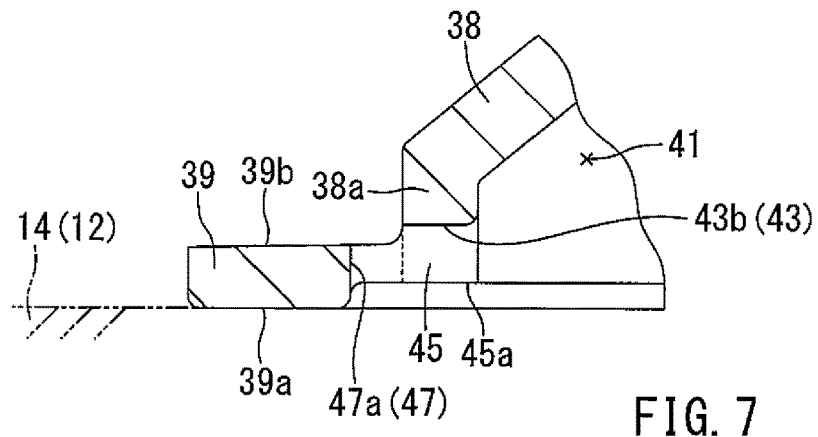
FIG. 7 is a cross-sectional view of a recess of a suction inlet part.
Figure 8:
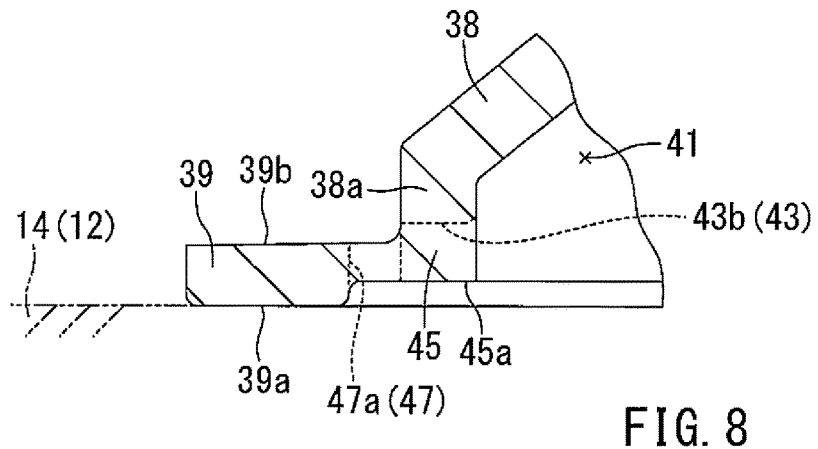
FIG. 8 is a cross-sectional view of a projection part of the suction inlet part.

As shown in FIGS. 4 and 6, the seat part 39 is a ring or annular plate coaxially disposed about and surrounding the lower end 38a of the suction inlet part 38. As illustrated in FIGS. 7 and 8, a bottom surface 39a of the seat part 39 is positioned below a lower surface 45a of each projection part 45 of the suction inlet part 38. An upper surface 39b of the seat part 39 is positioned below a downward facing surface 43b defined by the ceiling or upper surface of each recess 43.

Figure 5:
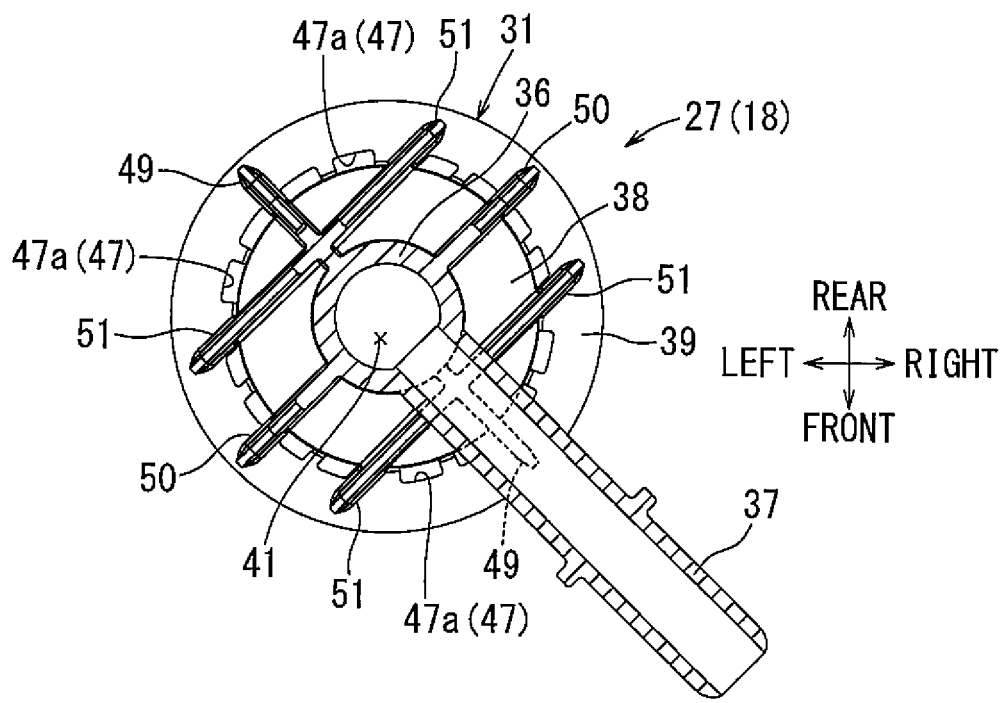
FIG. 5 is a cross-sectional view of an adaptor body of the sender gauge adaptor of FIG. 4, taken along line V-V in FIG. 4.

An inner circumference of the seat part 39 includes a plurality of circumferentially-spaced inner circumferential grooves 47 that extend vertically through the seat part 39. Each groove 47 is in fluid communication with a corresponding recess 43. As illustrated in FIG. 5, the radially outer surfaces 47a of the inner circumferential grooves 47 lie along a circle centered about an axis of the seat part 39. As illustrated in FIG. 8, a downward surface of the seat part 39 positioned radially within that circle is flush with the lower surface 45a of each projection part 45 of the suction inlet part 38. The bottom surface 39a of the seat part 39 (excluding the downward surface of the seat port 39 that is flush with the lower surface 45a of each projection part 45) has a surface area larger than the total surface area of the lower surfaces 45a of the projection parts 45. The seat part 39 may also be referred to herein as "support part" herein.

Each of the inner circumferential grooves 47 allows fluid communication between the interior and the exterior of the suction inlet part 38 together with the corresponding recess 43, and thus may be considered as a part of the corresponding recess 43.

As illustrated in FIG. 1, the side of the fuel suction part 31 is provided with first ribs 49 and second ribs 50, each rib 49, 50 extending vertically between the base part 28 and the seat part 39. As illustrated in FIG. 5, each first rib 49 extends parallel to the central axis of the connection pipe part 37 in a plan view, and each second rib 50 extends in a perpendicular to the central axis of the connection pipe part 37 and the central axis of the base pipe part 36 in a plan view. As illustrated in FIG. 2, on the connection pipe part 37 side, one of the first ribs 49 extends vertically from both an upper side and a lower side of the connection pipe part 37.

As illustrated in FIG. 1, third ribs 51 are formed between the first rib 49 and the seat part 39. As illustrated in FIG. 5, the third ribs 51 extend parallel to and on both sides of the second ribs 50, and perpendicular to the first ribs 49 in the plan view. As illustrated in FIG. 2, upper end portions of the third ribs 51, each of which extends perpendicular to the first rib 49 on the connection pipe part 37 side, are connected to the connection pipe part 37. As illustrated in FIG. 6, the projection parts 45 of the fuel suction part 31 are alternately coupled to any one of the first rib 49, the second rib 50, and the third ribs 51.

As illustrated in FIG. 2, a spring 53 is disposed between the guide pipe part 25 of the lid member 16 and the guide column part 30 of the sender gauge adaptor 18. In this embodiment, the spring 53 is a coil spring made from a metal material. A lower end of the spring 53 is in contact with the upper surface of the base part 28 of the sender gauge adaptor 18 or is fixedly engaged with a base end, i.e. a lower end of the guide column part 30. An upper end of the spring 53 is in contact with a ceiling surface, i.e. a downward facing surface, of the guide pipe part 25 of the lid member 16. The spring 53 is compressed between the lid member 16 and the sender gauge adaptor 18. Accordingly, the lid member 16 and the sender gauge adaptor 18 are biased in mutually opposed directions due to the biasing force, i.e. the elastic restoring force of the spring 53. The spring 53 may also be referred to herein as "elastic member." Although not illustrated, lead wires linked to an electrical circuit of the sender gauge 20 are electrically connected to the electric connector part 24 on the lower surface side of the lid body 22.

The connection pipe part 37 of the sender gauge adaptor 18 of the suction module 10 is connected to a jet pump (not shown) of the pump module via a fuel pipe 55. An external connector linked to a control device, i.e. an electronic control unit (ECU), is attached to the electric connector part 24.

As illustrated in FIG. 2, the suction module 10 is installed in the fuel tank 12 by inserting the suction module 10 through the opening 13a of the upper wall 13 of the fuel tank 12 and attaching the lid member 16 to the upper wall 13 against the biasing force of the spring 53. In this state, the fitting wall 23 of the lid member 16 is fitted into the opening 13a of the fuel tank 12, and an outer circumferential periphery of the lid body 22 is disposed on a hole edge part of the opening 13a. Due to this configuration, the opening 13a of the upper wall 13 of the fuel tank 12 is closed. The sender gauge adaptor 18 is pressed against the bottom wall 14 of the fuel tank 12 by the biasing force of the spring 53 such that the seat part 39 abuts the bottom wall 14 in a surface contact manner.

Due to operation of the jet pump of the pump module, the fuel in the second storage part of the fuel tank 12 is suctioned into the fuel suction passage 41 via apertures or flow paths, which are defined by the recesses 43 and the inner circumferential grooves 47 of the fuel suction part 31 of the sender gauge adaptor 18. The fuel is transferred to the first storage part through both the connection pipe part 37 and the fuel pipe 55. The sender gauge adaptor 18 is pressed against the bottom wall 14 of the fuel tank 12 by the elastic restoring force of the spring 53. Thus, when the fuel tank 12 expands or contracts in the vertical direction due to changes in temperature or the like, the seat part 39 remains in contact with the bottom wall 14.

In accordance with the sender gauge adaptor 18, the seat part 39 of the adaptor body 27 may prevent the projection parts 45 from coming into contact with the bottom wall 14 of the fuel tank 12. Thus, it is able to reduce the likelihood or prevent a corner of the lower surface 45a of each projection part 45 of the lower end 38 from damaging the bottom wall 14 of the fuel tank 12.

The seat part 39 increases a contact area, i.e. an abutting area between the sender gauge adaptor 18 and the bottom wall 14 of the fuel tank 12, so that it is able to decrease the pressure per unit area applied by the seat part 39 to the bottom wall 14 in comparison with conventional apparatuses. Thus, a load on both the bottom wall 14 of the fuel tank 12 and the seat part 39 can be dispersed, thereby reducing the likelihood or preventing the seat part 39 from damaging the bottom wall 14 of the fuel tank 12.

The seat part 39 has an annular or ring shape surrounding the suction inlet part 38. Thus, the seat part 39 can be formed compactly at the suction inlet part 38. Further, it is able to prevent the seat part 39 from coming into contact with the bottom wall 14 in a point contact manner regardless of deformation of the bottom wall 14 of the fuel tank 12.

The technique disclosed herein is not limited to the above embodiments and can be varied within a scope of this disclosure. For example, the fuel suction inlet member is not limited to use in the vehicle and may be used for various fuel supply devices for a ship, an industrial machinery, etc. The fuel suction inlet member is not limited to use in the suction module 10 and may be used for a pump module. The gauge attachment part 29 of the sender gauge adaptor 18 may be omitted. The seat part 39 may extend intermittently in the circumferential direction. The support part, i.e. the seat part 39 is not limited to be formed at the suction inlet part 38 and may be provided at the base part 28.

The invention claimed is:

1. A fuel suction inlet member for a fuel tank, comprising:
a suction inlet body pressed against a bottom wall of the fuel tank by an elastic member, wherein:
the suction inlet body has a suction inlet part having a hollow cylindrical shape that opens downward;
the suction inlet part having a circumference and including a plurality of recesses and a plurality of projection parts at a lower end thereof, the recesses and the projection parts are alternately arranged in a circumferential direction about the lower end of the suction inlet part;
each of the recesses is in fluid communication with an interior and an exterior of the suction inlet part;
each of the projection parts has a polygonal-shaped lower surface; and
the suction inlet body includes a support part having a ring shape surrounding substantially the entire circumference of the suction inlet part and wherein the support part abuts the bottom wall of the fuel tank along a surface contact at a position below the lower surfaces of the projection parts.

2. The fuel suction inlet member of claim 1, wherein the ring shape of the support part has an annular lower surface that abuts the bottom wall of the fuel tank along the surface contact.

3. The fuel suction inlet member of claim 1, wherein the support part extends radially to connect to lower ends of the projection parts.

4. The fuel suction inlet member of claim 2, wherein the support part is concentric with the suction inlet part.

5. The fuel suction inlet member of claim 2, wherein the support part extends radially outwards from an end of the suction inlet part.

6. The fuel suction inlet member of claim 2, wherein a plurality of circumferential grooves are formed in the support part that are connected to the plurality of recesses of the suction inlet part.

\* \* \* \* \*